United States Patent [19]
Smirl

[11] 3,802,294
[45] Apr. 9, 1974

[54] AUTOMOTIVE TRANSMISSION

[75] Inventor: Richard L. Smirl, La Grange Park, Ill.

[73] Assignee: Borg-Warner Corporation, Chicago, Ill.

[22] Filed: Sept. 28, 1972

[21] Appl. No.: 293,201

[52] U.S. Cl............... 74/759, 74/765, 74/740, 74/682
[51] Int. Cl............................................ F16h 57/10
[58] Field of Search .............. 74/759, 765, 740, 682

[56] References Cited
UNITED STATES PATENTS

| 2,620,285 | 12/1952 | Smirl | 74/752 |
| 3,473,415 | 10/1969 | Kepner | 74/759 |
| 3,483,771 | 12/1969 | Förster et al. | 74/759 |
| 2,844,975 | 7/1958 | Kelbel et al. | 74/759 |
| 2,813,437 | 11/1957 | Kelbel et al. | 74/759 |

Primary Examiner—Benjamin W. Wyche
Assistant Examiner—Lance W. Chandler
Attorney, Agent, or Firm—Donald W. Banner

[57] ABSTRACT

An automotive transmission having two simple planetary gear sets and friction clutches and brakes controlling the gear sets to obtain four forward speed ratios and a single reverse speed ratio, the fourth forward speed ratio being an overdrive ratio.

18 Claims, 3 Drawing Figures

AUTOMOTIVE TRANSMISSION

SUMMARY OF THE INVENTION

This invention relates to automotive transmissions and more particularly to such transmissions including planetary gear set combinations having suitable controls to provide a plurality of forward speed ratios and a reverse speed ratio.

Passenger automobiles, with small high-speed engines, have increased in sales popularity because of their low-cost and economical operation and mechanical maintenance. Various engine and drive arrangements have been proposed, including front engine with front wheel drive; an engine disposed longitudinal of the automobile with four-wheel drive; front engine with a dropped shaft, such as the de Dion drive; rear engine with front drive; and rear engine with rear drive. In these small engine-drive combinations, it is desirable to provide transmissions preferably of the type referred to as friction start transmissions, since it has been found by computer studies of the vehicle performance, that when sufficient gear ratio coverage has been provided to satisfy the performance requirements of small high speed engines, that the usefulness of the hydraulic torque converter is limited to very low vehicle speeds whereas its losses in small sizes result in a net loss of performance compared to a friction start clutch having a stall speed designed to maintain the traction limit throughout most of the first speed range.

It is an object of the invention to provide, in a preferred embodiment of the invention, a friction start type transmission capable of being readily adaptable for use in the different described engine-drive arrangements and having relatively simple gearing controllable to provide, in addition to reverse speed ratio, sufficient forward speed ratios for optimum performance. For this purpose, the improved transmission comprises two simple planetary gear sets connected to each other and to an integral final drive gear, the gear sets being capable of establishing four forward speed ratios including an overdrive ratio, and a single reverse speed ratio, the relative motion of the gear elements of the planetary gear sets being controlled by a novel combination of friction clutch and brake devices that can be applied and released to establish the various speed ratios.

In carrying out my invention, there are front and rear simple planetary gear sets each comprising sun and ring gears and planet gears in mesh therewith and mounted in a planet carrier. The sun gears of each set are connected to each other to form a unitary assembly, and the ring gear of the front set is connected to a final drive gear and the planet carrier of the rear set to form a unitary assembly. The connected sun gears provide low speed ratio and reverse speed ratio by way of the starting clutch and in addition, provide the reaction for a fourth or overdrive speed ratio. The planet carrier of the front set is controllable to provide second, third and fourth input and reverse reaction. The ring gear of the rear set provides reaction points for first and second speed ratios.

DETAILED DESCRIPTION

Figure 1:
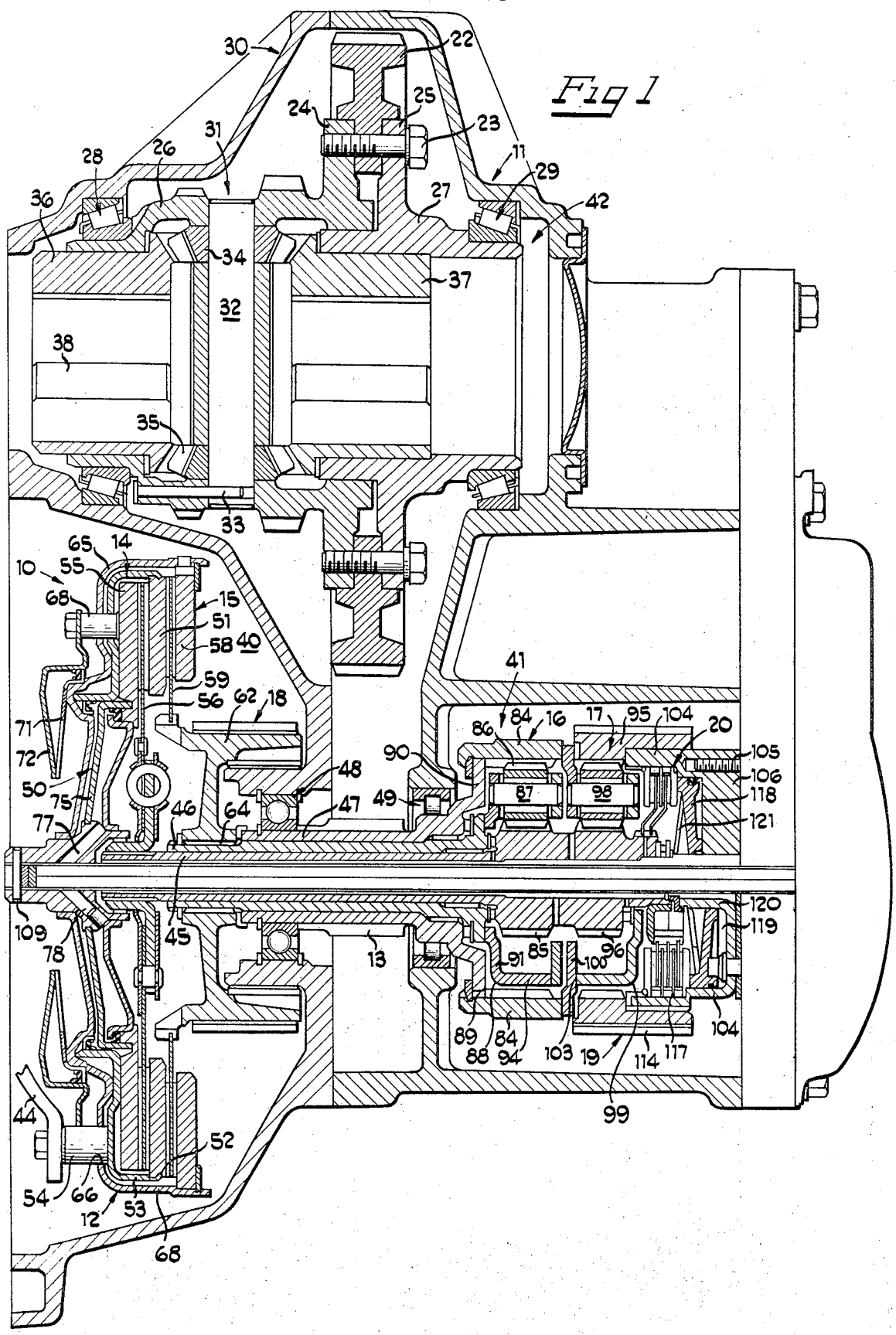
FIG. 1 is a longitudinal sectional view of the automotive transmission and its application to a final transaxle drive arrangement.
Figure 2:
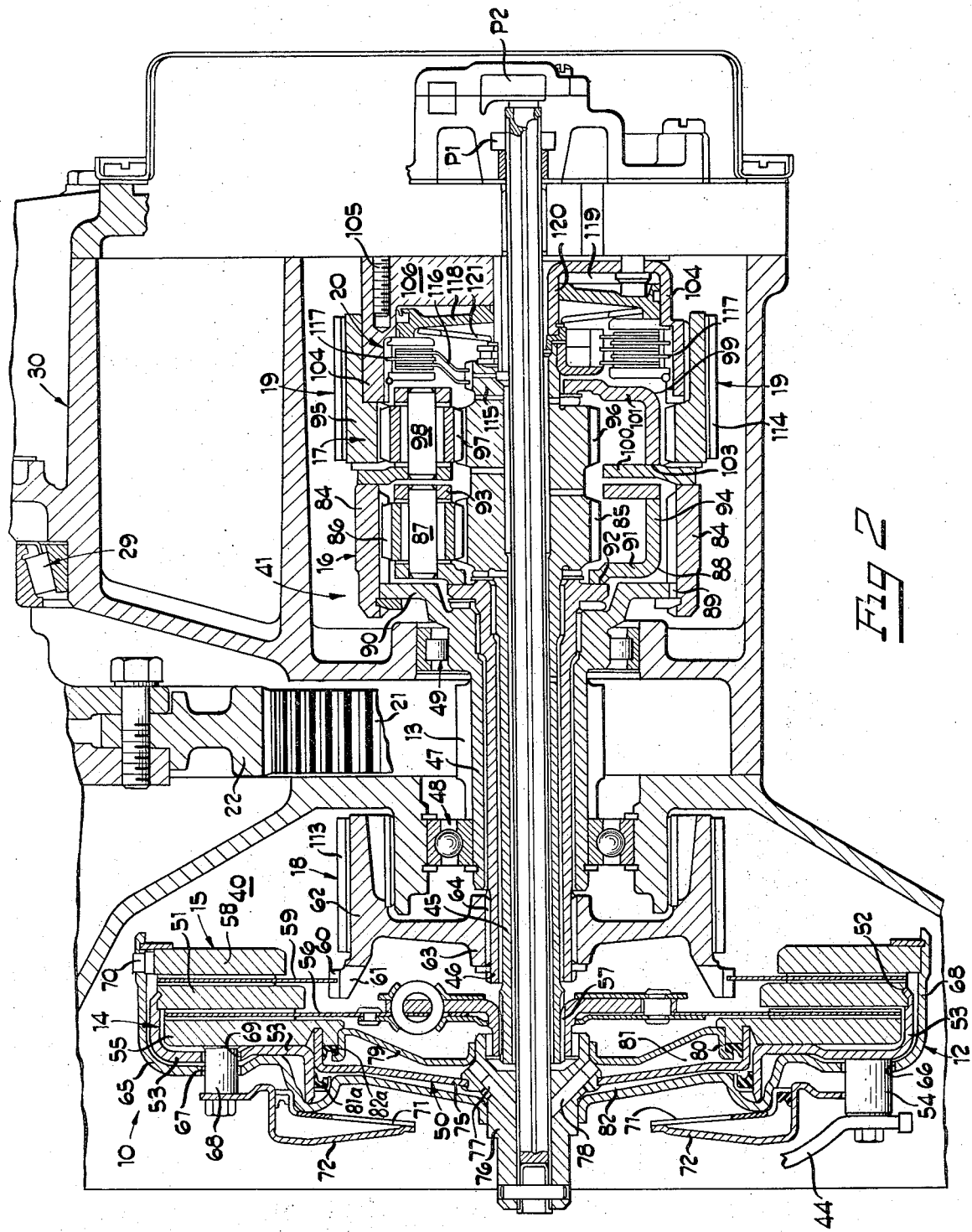
FIG. 2 is an enlarged view of the transmission shown in FIG. 1, the transmission being shown in a different longitudinal section.

Referring to FIGS. 1 and 2, the improved transmission is generally indicated at 10 and is shown in its application to a final transaxle drive arrangement identified at 11.

The transmission 10, in its preferred form, comprises, generally, a drive assembly 12, a driven member or gear 13, combined fluid pressure-operated friction clutch assemblies 14 and 15, two simple planetary gear sets 16 and 17, and three fluid pressure-operated friction brake assemblies 18, 19 and 20.

The final transaxle drive arrangement 11 includes an idler gear 21 (FIG. 2) and a driven gear 22 meshing with each other and the gear 21 meshing with the transmission driven gear 13 to effect rotation of gears 21 and 22. The gear 22 has its inner periphery extending between and secured, by bolts 23, to juxtaposed radial flanges 24 and 25 of annular mounting members 26 and 27, the mounting members being rotatably mounted on roller bearing assemblies 28 and 29 disposed in a housing 30. Differential gearing 31 is positioned within the mounting members 26 and 27 and are rotatable on shaft 32 having its ends extending within and fixed to the mounting member 26 by a pin 33. The gearing 31 comprises bevel gears 34 and 35 rotatable on shaft 32 and in complementary meshing engagement with gear teeth on the ends of cylindrical hubs 36 and 37 respectively supported by the mounting members 26 and 27 for rotation relative to each other and to the mounting members. The hub 36 has splines 38 provided interiorly thereof for connection to a pot-type universal joint connected to a road wheel-driving axle (not shown).

As shown in FIG. 1, the housing 30 is designed to mount the transmission 10 and final drive arrangement 11 in a manner that they are positioned as a unitary compact assembly for connection to the automotive engine and the vehicle drive wheels when both are disposed at one end of the vehicle to provide either front wheel drive or rear wheel drive. For this purpose, the housing 30 comprises a compartment 40 to contain the combined friction clutch assemblies 14 and 15, a compartment 41 for the planetary gear sets 16 and 17, and a compartment 42 extending parallel to the compartments 40 and 41 and containing the final drive arrangement 11. The transmission driven gear 13 is disposed between and exteriorly of the compartments 40 and 41 to engage gear 21 to transmit drive to the differential gearing 31 within the compartment 42.

Referring now to the transmission 10 shown in FIGS. 1 and 2, the transmission 10 is drivingly connected to the rear extremity of an engine crankshaft by any suitable means, such as a drive plate 44 (FIG. 2). The drive plate 44 is adapted to support the driving members or plates of the clutch assemblies 14 and 15 engageable with driven friction plates of the assemblies respectively keyed to telescoping sleeve shafts 45 and 46, which are drivingly connected to the planetary gear sets 16 and 17. The gear set 16 is also drivingly connected to a stub sleeve shaft 47 having a portion provided with teeth to form the gear 13. The shaft 47 is rotatably supported on the housing 30 by bearing assemblies 48 and 49. Engagement of the driving plates and the driven plates of the clutch assemblies 14 and 15 is effected by a fluid pressure actuated mechanism indicated generally at 50. The clutch operating mechanism 50 is fluid-pressure operated to alternatively or successively effect engagement of the clutches 14 and 15 to transmit torque from the engine to either or both of the shafts 45 and 46.

Referring more particularly to the clutch assemblies 14 and 15, an annular clutch driving plate 51 has a plurality of circumferentially spaced notches 52 in its outer periphery, the notches receiving teeth formed by the serrated edge of the radially inwardly turned outer peripheral edge of a plate 53 and providing a fixed driving keyed engagement between the plates 51 and 53. The engine-driven plate 44 is bolted to the plate 53 by a plurality of collars 54 disposed between the plate 44 and abutting the plate 53 and welded thereto to provide an assembly rotatable as a unit. The clutch driving plate 51 is common to and may be considered as one of the driving members of the clutch 14 or clutch 15. The clutch 14 further comprises an axially movable pressure plate 55, and a driven friction plate 56 disposed between the plates 55 and 51 and having its hub splined as at 57 to the shaft 45. The clutch 15 also comprises an axially movable pressure plate 58, and a driven plate 59 disposed between the plates 51 and 58 and splined as at 60 to an extension 61 of a drum 62 of the brake 18, the drum having a hub 63 splined at 64 to the quill shaft 46.

The pressure plates 55 and 58 are connected to the plate 53 and thereby to the drive plate 44 for rotation therewith by means of a dished sheet metal drum-like stamping or plate 65 provided with a plurality of side openings 66 slidably receiving the collars 54 on plate 53 and having other side openings 67 receiving a plurality of collars 68 extending therethrough and through openings 69 in plate 53, the collars 68 being welded to the pressure plate 58, and circumferentially spaced openings in the outer periphery of plate 61 receiving bolts 70 threaded into the openings in the plate 61. This described clutch assembly thus provides for selective or conjoint engagement of the clutches 14 and 15 at the option of the operator. The clutches are normally held in disengaged relation by the provision of a Belleville type spring washer 71 held in assembly with the clutches by an annular retainer 72 having its outer peripheral edge secured to the collars 68 by bolts, as shown, so that the radially inner edge of the retainer bears with considerable force against the radially inner end of the Belleville washer. As a result, the radially outer rim of the washer exerts sufficient pressure against plate 65 to position the plate 58 out of engagement with the driven plate 59. At the same time, the reaction force of the spring washer 71 exerted on the retainer 72 causes the retainer to move the plate 55 out of engagement with the driven plate 56.

Fluid operated actuating mechanism 50 is utilized to effect axial movement of the pressure plates 55 and 58 toward the intermediate plate 51 for engagement of the clutches. The clutch actuating mechanism 50 comprises an annular pressure fluid-distributing member or plate 75 having, at its radially inner extremity, a hub 76 provided with pressure fluid conducting passages 77 and 78. Disposed at opposite sides of the plate 75 are the plate 65 forming a piston, and an annular dished piston plate 79, both the plates 65 and 79 each having a radially inner extremity slidably engaging the hub 76, the plate 79 having an annular rim 80 seated against the radially inner edge of the plate 55 for actuation thereof upon fluid under pressure entering the chamber 81 and forcing the piston plate 79 and plate 55 toward the driven plate 56 to engage the plates 55, 56 and 51 to transmit drive to shaft 45. The plates 65 and 75 define a pressure fluid chamber 82 receiving fluid under pressure from passage 78 to cause the plate 65 to move to the left to move clutch plate 58 to engage driven plate 59 with plates 51 and 58 to provide drive to the drum 62 and shaft 46. Seal 81a and a seal 82a prevent the escape of fluid from the two pressure fluid chambers 81 and 82 defined by the distributor plate 75 and pistons 65 and 79, respectively. A central hollow shaft, closed at its front end, extends longitudinally through the shaft 45 and serves to provide parallel pressure fluid passages respectively connected to passages 77 and 78 to the chambers 81 and 82 from pump parts P1 and P2.

Suitable controls (not shown) may be provided for controlling the flow of fluid under pressure from a pump (not shown) to either or both of the passages 77 and 78 to effect alternate or successive engagement of the pressure plates 55 and 58 with the driven clutch plates 56 and 59 to drivingly connect the engine to either or both of the shafts 45 and 46, as desired.

It will be apparent that, upon the release of fluid under pressure in the chambers 81 and/or 82, the the energy stored in Belleville washer spring 71 and retainer 72 will become active to return the clutch parts and their actuating controls to their original positions shown in FIGS. 1 and 2.

The planetary gear set 16 comprises a ring gear 84 and a sun gear 85 and planet gears 86 meshing with the sun and ring gears. The planet gears 86 are rotatably mounted on stub shafts 87 on planet gear carrier 88. The ring gear 84 is splined, as at 89, to a radially extending flange 90 of the sleeve shaft 47 to effect rotation of the driven gear 13. The planet carrier 88 comprises a drum having its radially extending portion 91 secured, at 92, to one end of the sleeve shaft 46 to rotate with the shaft 46. The carrier includes a ring 93 welded to the drum and cooperates with its portion 91 to support the planet gear-carrying stub shafts 87, the planet gears projecting outwardly through circumferentially spaced openings in the cylindrical portion 94 of the drum.

The planetary gear set 17 comprises a cylindrical drum having teeth to provide a ring gear 95 and includes a sun gear 96, and planet gears 97 meshing with the sun and ring gears. The planet gears are rotatably mounted on stub shafts 98 on a planet carrier 99, the shafts 98 being supported on a ring 100 of the carrier, welded to the ring gear 84, and on a radially extending portion 101 of a drum forming a portion of the carrier 99, the rim edge of the drum being secured, as at 103, by welding to the ring 100 so that the planet carrier 99 and ring gear 84 rotate as a unitary assembly. The ring gear 95 is rotatably mounted on the annular rim of a drum 104 secured by bolts 105 to an end wall 106 of the housing 30. The sun gear 96 and the sun gear 85 are formed as integral portions of the shaft 45 to be simultaneously rotatable thereby. The housing wall 106 contains a pump (not shown), which may be of the gerotor type, and also hydraulic controls (not shown) for directing pressure fluid from the pump to the clutch assemblies 14 and 15 and brake assemblies 18, 19, 20. It will be noted that the pump is activated to provide fluid under pressure during operation of the automotive engine.

The friction brake 18 comprises the brake drum 62 connected with the driven clutch plate 59, to the common hub 63; and a brake band 113 adapted to engage the drum 62 to prevent rotation of the planet carrier 88 of the gear set 16.

The friction brake 19 comprises a brake band 114 engageable with the drum 95 to prevent rotation of the ring gear of the planetary gear set 17.

The friction brake 20 comprises a hub 115 splined to the shaft 45, discs 116 splined onto the hub 115, and discs 117 disposed between the discs 116 and splined to the drum 104. A hydraulic piston 118 is provided for engaging the discs 116 and 117 with each other. The piston 118 is disposed within an annular chamber 119 formed by the drum 104 and a hub 120, the hub 120 being fixed to the radially inner edge of the drum 104. A Belleville washer type spring 121 is provided for retracting the piston to its brake disengaging position in which it is shown. The friction brake 20 is engaged to connect the shaft 45 and the housing 30 to prevent rotation of the shaft 45 and thereby the sun gears 85 and 96.

The illustrated transmission provides four forward speed ratios and reverse drive. Low or first speed forward drive is provided when the clutch 14 and brake 19 are engaged. In this case, the drive is from the engine-driven plate 44 to the driving clutch plates 51 and 55 to the driven clutch plate 56, shaft 45, sun gear 96, planet gear 97 and its carrier 99, to the ring gear 95. Since the brake band 114 of brake 19 holds the drum 95, and thereby the ring gear of planetary gear set 17, stationary, the ring gear functions as a reaction element, and the gear sets are effective to drive the ring gear 84 and thereby the shaft 47 and driven output gear 13 at a lower speed but at an increased torque with respect to the shaft 45.

Second speed forward drive is obtained by releasing clutch 14 and engaging clutch 15 while brake 19 is engaged. The clutch 15 effects drive from the clutch pressure plates 51 and 58 to the driven clutch plate 59 and to the shaft 46, planet carrier 88, planet gears 86 to the sun gear 85 and ring gear 84. Since brake 19 is engaged, the ring gear 95 affords a reaction element effective to cause the ring gear 84 and thereby shaft 47 and gear 13 to rotate at a higher speed than in first or low speed drive.

Third speed or direct drive is obtained by engaging clutches 14 and 15 while brake 19 is disengaged. The resultant locking together of the gear sets 16 and 17 causes the same to rotate as a unitary assembly to provide direct drive of the shaft 47 and gear 13 at engine speed.

Fourth speed drive provides an overdrive speed ratio and is obtained by engaging clutch 15 and brake 20. The clutch 15 effects drive from the engine to the shaft 46 and to the planet carrier 88 of the gear set 16, while the engaged brake 20 prevents rotation of the shaft 45 and thereby sun gears 85 and 96, to cause the gear sets to function to drive the shaft 47 and output gear 13 at an overdrive with respect to the input shaft 46.

Reverse drive is obtained by engaging clutch 14 and brake 18. The clutch 14 is operative to drive shaft 45 and sun gear 85 and thereby rotate planet gears 86 to effect rotation of the ring gear 84. Since the planet gear carrier 88 is held stationary by brake 18, the action of the gear set 16 on the gear set 17 is such as to cause the planet gear carrier 99 and thereby the ring gear 84, shaft 47 and gear 13 to rotate at a reverse underdrive.

Figure 3:
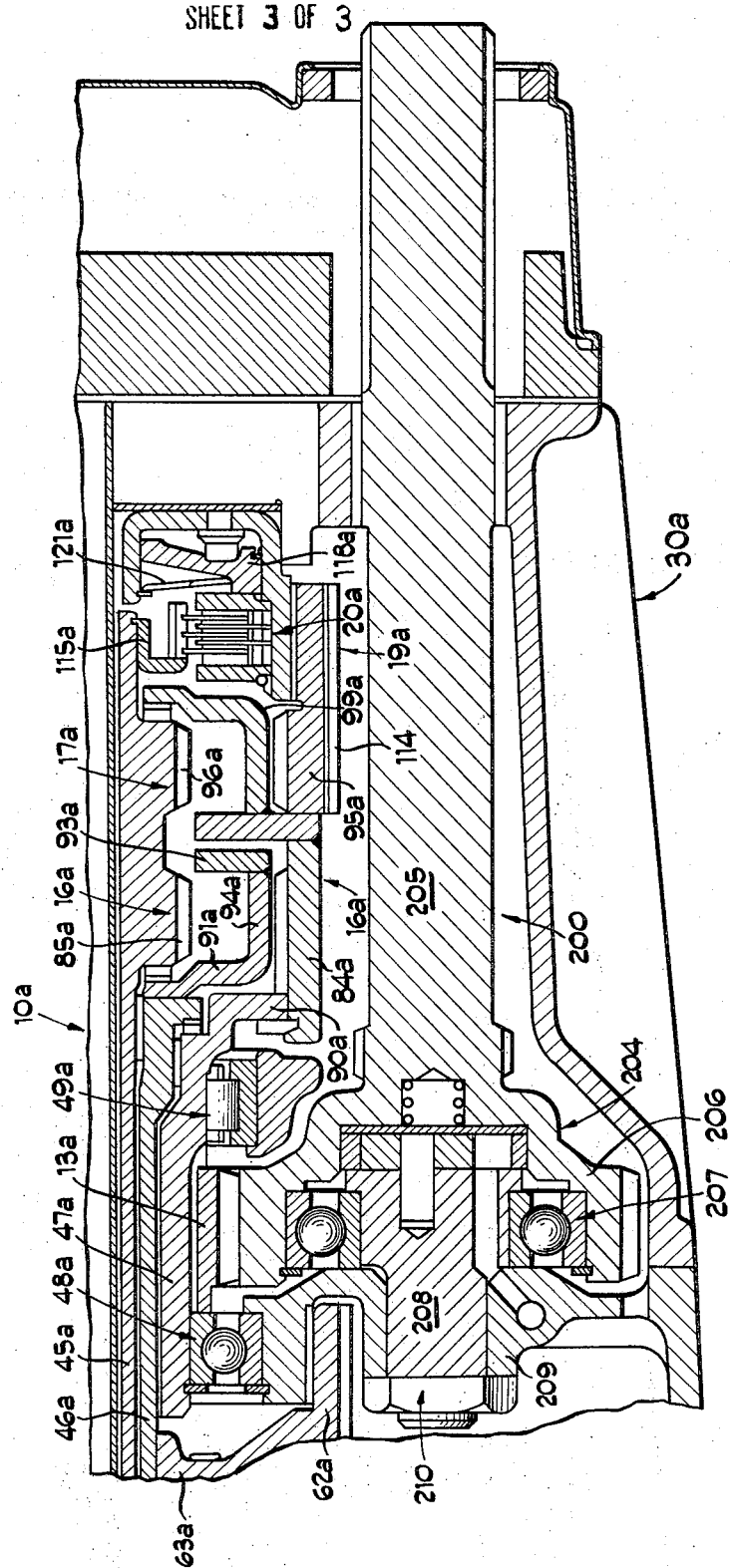
FIG. 3 is a longitudinal sectional view of the lower half of the transmission shown in FIG. 1 and its application to a final countershaft drive arrangement.

FIG. 3 illustrates the combination of the transmission with a countershaft type final drive arrangement, certain parts of the transmission shown in FIGS. 1 and 2 being identified by the same numbers with the added suffix a.

The transmission 10a and final drive arrangement generally indicated at 200 are mounted within the housing 30a, the housing having spaced walls for mounting a countershaft assembly 204 of the final drive arrangement. More particularly, the countershaft assembly comprises the shaft 205 rotatably mounted in the housing and having a bell-shaped gear portion 206 meshing with the transmission output gear 13a and rotatably supported by a bearing assembly 207 fitted within the bell-shaped portion 206 and supported on a stub shaft 208. The shaft 208 is supported within and fixed to a cylindrical portion 209 of a wall of the housing and is connected thereto by a nut 210 positioned on the threaded end of the shaft 208 and abutting the housing, the nut being operative to fix the shaft 208, inner race of the bearing assembly 207, and housing together to prevent relative rotation.

It will be apparent that the transmission, as a whole, and in its combination with the disclosed exemplary transaxle type or countershaft type final drive arrangement provides an ideally compact unit since the two described simple planetary gear sets are interconnected to provide four forward speed drives and a drive in reverse, and a minimum number of control elements, namely, only two friction clutches and three friction brakes are utilized for providing the drives, making the transmission particularly suitable for application to vehicle installations where space is at a premium. In addition, the transmission has considerable versatility in its adaptation to many different types of automobile engine and drive arrangements including, for example, front engine — front drive; longitudinal engine — four wheel drive; front engine — dropped shaft, de Dion drive; rear engine-front drive; and rear engine - rear drive. In this respect, the disposition of the final drive gear centrally of the transmission is believed to be of considerable importance.

The above-described embodiment is illustrative of the invention which may be modified within the scope of the appended claims.

I claim:

1. In a transmission, the combination of a drive member, a driven member, a first planetary gear set, a second planetary gear set, each of said gear sets comprising a sun gear and a ring gear and a planet gear in mesh with said sun gear and said ring gear, and a planet gear carrier, said sun gear of said first set and said sun gear of said second set being connected together, means connecting said ring gear of said first set to said driven member and to said gear carrier of said second set; means including a first clutch for connecting said drive member with said connected sun gears; means including a second clutch for connecting said drive member with said planet gear carrier of said first set; a first brake for holding said ring gear of said second set; and a second brake for holding said connected sun gears, said first clutch and said first brake when both are engaged completing a first change speed drive from said drive member to said driven member, said second clutch and said second brake when engaged completing a second change speed drive from said drive to said driven member.

2. In a transmission, the combination as defined in claim 1 in which said first change speed drive is a low speed forward drive, and said second change speed drive is an overdrive speed forward drive.

3. In a transmission, the combination defined in claim 1 in which said first and second clutches, when both are engaged, completing a third change speed drive from said drive member to said driven member.

4. In a transmission, the combination as defined in claim 3 in which said third change speed drive is a direct drive between the drive and driven members.

5. In a transmission, the combination as defined in claim 1 and including a third brake holding said planet gear carrier of said first set, said first clutch and said third brake when engaged completing a reverse drive from said drive member to said driven member.

6. In a transmission, the combination as defined in claim 1 in which said second clutch and said first brake when engaged complete a third speed change drive from said drive member to said driven member.

7. In a transmission, the combination as defined in claim 6 in which said third speed change drive is a higher reduced speed forward drive than said first speed change drive.

8. In a transmission, the combination as defined in claim 3 and in which said first speed change drive is a low speed forward drive, said second change speed drive is an overdrive speed forward drive, and said third change speed drive is a direct drive between the drive and driven members.

9. In a transmission, the combination as defined in claim 8 in which second clutch and said first brake when engaged complete a higher reduced speed forward drive than said low speed forward drive.

10. In a transmission, the combination as defined in claim 8 and including a third brake holding said planet gear carrier of said first gear set, said first clutch and said third brake when engaged completing a reverse drive from said drive member to said driven member.

11. In a transmission, the combination as defined in claim 1 in which said means connecting said ring gear of said first gear set to said driven member includes a shaft disposed and extending between said second clutch and said first planetary gear set, and said driven member is a gear on said shaft.

12. In a transmission, the combination defined in claim 1 in which said means connecting said drive member with said connected sun gears includes a first shaft, and said means connecting said drive member with said planet gear carrier of said first set includes a second shaft telescoping said first shaft, and in which said means connecting said ring gear of said first gear set to said driven member includes a third shaft surrounding said telescoping shafts and extending between said second clutch and said first gear set, and in which said driven member is a gear on said third shaft.

13. In a power transmission, the combination of an input drive member; planetary gearing having first, second and third elements including a sun gear element, planet gears meshing with said sun and ring gear elements, and a planet gear carrier element; a clutch assembly including first and second clutches having engageable drive and driven friction plates, said drive plates being connected to and rotatable by said input drive member; means connecting said driven plate of said first clutch to said first gearing element; means connecting said driven plate of said second clutch to said second gearing element and including a shaft; and an output driven member between and in axially spaced relation to said clutch assembly and said gearing and rotatable on said shaft by said third element of said gearing.

14. In a transmission as defined in claim 13 including brake means connected to said shaft and located between said second clutch and said output member and in axially spaced relation to said gearing, said brake means being operative to hold said shaft to complete a change speed drive from said drive member to said output member.

15. In a transmission as defined in claim 13 including a housing having axially spaced and aligned first and second compartments, said first compartment containing said clutch assembly and said brake means, and said second compartment containing said planetary gearing, said output driven member being disposed between said compartments.

16. In a transmission as defined in claim 14 in which said brake means includes a brake drum connected to said shaft in close proximity to said driven plate of said second clutch.

17. In a transmission as defined in claim 13 in which said output driven member includes a drive-transmitting shaft telescoping said first-named shaft and disposed between said clutch assembly and said gearing.

18. In a transmission as defined in claim 13 in which said third element of said gearing is the ring gear element.

* * * * *